United States Patent
Tange et al.

(10) Patent No.: US 10,556,660 B2
(45) Date of Patent: *Feb. 11, 2020

(54) BALLAST WATER TREATMENT DEVICE

(71) Applicant: MIURA CO., LTD., Ehime (JP)

(72) Inventors: Tomoaki Tange, Ehime (JP); Akinori Kawakami, Ehime (JP)

(73) Assignee: MIURA CO., LTD., Ehime (JP)

( * ) Notice: Subject to any disclaimer, the term of this patent is extended or adjusted under 35 U.S.C. 154(b) by 151 days.

This patent is subject to a terminal disclaimer.

(21) Appl. No.: 15/253,171

(22) Filed: Aug. 31, 2016

(65) Prior Publication Data

US 2016/0368581 A1 Dec. 22, 2016

Related U.S. Application Data

(63) Continuation of application No. 14/388,170, filed as application No. PCT/JP2013/080158 on Nov. 7, 2013, now Pat. No. 9,475,566.

(30) Foreign Application Priority Data

Nov. 12, 2012 (WO) .................. PCT/JP2012/079250

(51) Int. Cl.
*B01D 35/02* (2006.01)
*B01D 35/147* (2006.01)
(Continued)

(52) U.S. Cl.
CPC .............. *B63J 4/002* (2013.01); *B01D 35/02* (2013.01); *B01D 35/147* (2013.01); *C02F 1/004* (2013.01);
(Continued)

(58) Field of Classification Search
CPC .. C02F 1/001; C02F 1/008; C02F 1/32; C02F 1/325; C02F 2209/40; C02F 2103/008;
(Continued)

(56) References Cited

U.S. PATENT DOCUMENTS 3,937,662 A 2/1976 Bartik
3,999,566 A * 12/1976 Iwata .................. E02F 7/04
                                                                    137/1
(Continued)

FOREIGN PATENT DOCUMENTS

EP 2394962 A1 12/2011
JP 10-109090 4/1998
(Continued)

*Primary Examiner* — Joseph W Drodge
(74) *Attorney, Agent, or Firm* — Muncy, Geissler, Olds & Lowe, P.C.

(57) ABSTRACT

A ballast water treatment device includes a ballast water treatment line, a pump for drawing and pressure feeding treatment target water, a filter, a ballast tank for storing filtered water, and an outboard discharger, and the pump, the filter, the ballast tank, and the outboard discharger are provided on the ballast water treatment line. Treatment target water drawn for a predetermined period from start of drawing treatment target water is not caused to pass through the filter but is discharged outboard by the outboard discharger, and discharging outboard by the outboard discharger is stopped at elapse of the predetermined period and treated water having been filtrated by the filter is poured into the ballast tank.

4 Claims, 1 Drawing Sheet

(51) Int. Cl.
  *B63J 4/00* (2006.01)
  *C02F 1/00* (2006.01)
  *C02F 1/32* (2006.01)
  *C02F 103/00* (2006.01)

(52) U.S. Cl.
  CPC .............. *C02F 1/008* (2013.01); *C02F 1/325* (2013.01); *C02F 2103/008* (2013.01); *C02F 2201/326* (2013.01); *C02F 2209/005* (2013.01); *C02F 2209/40* (2013.01); *C02F 2209/44* (2013.01); *C02F 2301/043* (2013.01); *C02F 2303/04* (2013.01)

(58) Field of Classification Search
  CPC ............ C02F 2303/04; C02F 2201/001; C02F 2201/008; C02F 2201/32; C02F 2209/11; C02F 1/004; C02F 2209/44; C02F 2209/005; C02F 2201/326; C02F 2301/043; B01J 4/002; B63J 4/00; B63J 4/002; B63J 4/02; B01D 35/02; B01D 35/147; B01D 36/00
  USPC ...... 210/87, 103, 130, 138, 241, 257.1, 258, 210/259, 192; 422/186.3; 250/432 R, 250/435
  See application file for complete search history.

(56) References Cited

U.S. PATENT DOCUMENTS

| | | | |
|---|---|---|---|
| 6,444,119 B1 * | 9/2002 | Mains, Jr. | B01D 17/0205 210/85 |
| 7,059,261 B2 | 6/2006 | Randall | |
| 7,128,009 B2 | 10/2006 | Randall | |
| 7,166,230 B2 | 1/2007 | Nilsen et al. | |
| 8,025,795 B2 | 9/2011 | Miner et al. | |
| 8,501,004 B2 * | 8/2013 | Lee | B63J 4/002 210/106 |
| 8,980,103 B2 | 3/2015 | Lee et al. | |
| 9,475,566 B2 * | 10/2016 | Tange | B63J 4/002 |
| 2002/0153324 A1 | 10/2002 | Lynch | |
| 2004/0159599 A1 | 8/2004 | Hamann et al. | |
| 2005/0040091 A1 * | 2/2005 | Nilsen | B01D 21/0012 210/198.1 |
| 2005/0155539 A1 * | 7/2005 | Randall | B63B 13/00 114/125 |
| 2005/0178708 A1 | 8/2005 | Mark | |
| 2006/0021951 A1 * | 2/2006 | Leeuwen | B63B 13/00 210/760 |
| 2008/0190826 A1 | 8/2008 | Miner et al. | |
| 2008/0277354 A1 * | 11/2008 | Baerheim | B63J 4/002 210/750 |
| 2008/0283467 A1 | 11/2008 | Nguyen | |
| 2010/0006490 A1 * | 1/2010 | Fukuyo | B63J 4/002 210/170.11 |
| 2010/0116647 A1 | 5/2010 | Kornmuller et al. | |
| 2010/0180810 A1 | 7/2010 | Liberg | |
| 2011/0114569 A1 * | 5/2011 | Kim | C02F 1/4674 210/739 |
| 2011/0120956 A1 | 5/2011 | Ivanter et al. | |
| 2015/0183663 A1 * | 7/2015 | Kuik | C02F 1/32 210/748.11 |

FOREIGN PATENT DOCUMENTS

| | | |
|---|---|---|
| JP | 2000-185280 | 7/2000 |
| JP | 2006-248510 A | 9/2006 |
| JP | 2008-200590 A | 9/2008 |
| JP | 2006-263664 A | 10/2008 |
| JP | 2011-255365 A | 12/2011 |
| JP | 2012-217966 A | 11/2012 |
| JP | 2013-23187 A | 2/2013 |
| JP | 2013-043143 A | 3/2013 |
| WO | WO 2012/061924 A1 | 5/2012 |

* cited by examiner

BALLAST WATER TREATMENT DEVICE

CROSS-REFERENCE TO RELATED APPLICATIONS

This application is a Continuation of application Ser. No. 14/388,170 filed on Jan. 5, 2015, which is a U.S. National Stage of International Application No. PCT/JP2013/080158 filed on Nov. 7, 2013, for which priority is claimed under 35 U.S.C. § 120; and this application claims priority of Application No. PCT/JP2012/079250 filed in Japan on Nov. 12, 2012 under 35 U.S.C. § 119, the entire contents of all of which are hereby incorporated by reference.

TECHNICAL FIELD

The present invention relates to a ballast water treatment device for treating ballast water stored on a vessel.

BACKGROUND ART

A vessel such as a tanker usually stores water called ballast water in a ballast tank provided on the vessel in order to balance the vessel under way while travelling toward another destination after unloading freight such as crude petroleum. Ballast water is normally charged at an unloading port and discharged at a loading port. If these ports are located at different places, microbes such as plankton and bacteria in the ballast water travel all over the world. When ballast water is discharged at a loading port in a sea area different from that of an unloading port, microbes in the other sea area are released at the loading port and may destroy the ecosystem in the sea area. In order to prevent such ballast water from destroying the marine environment, the International Maritime Organization (IMO) has entered into the International Convention for the Control and Management of Ships' Ballast Water and Sediments and has set a ballast water discharge standard to restrict the microbe content in ballast water discharged from ships.

This ballast water discharge standard sets the discharge limits for plankton according to sizes, specifically, at most 10 individuals/m$^3$ for plankton of 50 μm or more and at most 10 individuals/m$^3$ for plankton of 10 to 50 μm. The ballast water discharge standard also sets the discharge limits for bacteria, such as less than 250 cfu/100 ml for coliform.

Ballast water to be stored in a ballast tank is thus required to be treated by killing microbes and the like in the ballast water.

An ultraviolet treatment method has been known as a measure for treating ballast water by killing microbes and the like therein. According to this method, treatment target water drawn as ballast water is irradiated with ultraviolet (see Patent Literature 1, for example).

At an early stage of ballast water drawing, water around a vessel is shaken and sand or mud at the bottom of the sea is raised to increase water turbidity and decrease ultraviolet transmittance of drawn treatment target water. In this case, ballast water may flow into a ballast tank while treatment targets therein are killed insufficiently due to insufficient ultraviolet illuminance.

There have been disclosed water treatment techniques for eliminating such danger, such as an ultraviolet sterilization method of detecting turbidity of treatment target water and adjusting illuminance of ultraviolet according to the turbidity (see Patent Literature 2) and a flowing water sterilization method of detecting turbidity of treatment target water and flowing water after checking that illuminance of ultraviolet reaches a sufficient level for microbe killing (see Patent Literature 3).

Patent Literature 1: JP 2006-248510 A
Patent Literature 2: JP 2000-185280 A
Patent Literature 3: JP 10-109090 A

DISCLOSURE OF THE INVENTION

Problems to be Solved by the Invention

When the water treatment techniques disclosed in the Patent Literature 2 and 3 are applied to ballast water treatment, the ultraviolet sterilization method disclosed in Patent Literature 2 fails to promptly control an ultraviolet irradiation amount when turbidity changes suddenly. Furthermore, initially drawn treatment target water has quite high turbidity so that the ultraviolet irradiation amount is insufficient even if ultraviolet irradiation output is increased to 100%. Such treatment target water is treated by insufficient microbe killing and flows into a ballast tank as ballast water due to the insufficient ultraviolet irradiation amount.

According to the flowing water sterilization method disclosed in Patent Literature 3, tap water with quite low turbidity is used as treatment target water and such water is flown at a sufficient ultraviolet irradiation amount. As described above, in the treatment of ballast water, initially drawn treatment target water has quite high turbidity and the ultraviolet irradiation amount is insufficient even if ultraviolet irradiation output is set to 100%. This leads to insufficient treatment of the initially drawn treatment target water.

An object of the present invention is to provide a ballast water treatment device that reliably and efficiently filters the ballast water.

Means for Solving the Problems

In order to achieve the object mentioned above, the invention provides a ballast water treatment device for filtrating water to be treated, and storing filtered water in a ballast tank, the device including: a ballast water treatment line; a pump for drawing and pressure feeding water to be treated; a filter for filtrating drawn water to be treated; a ballast tank for storing filtered water; and an outboard discharger; the pump, the filter, the ballast tank, and the outboard discharger being provided on the ballast water treatment line; wherein water to be treated drawn for a predetermined period from start of drawing water to be treated or until decreasing temporarily increased turbidity of the water to be treated is not caused to pass through the filter but is discharged outboard by the outboard discharger, and discharging outboard by the outboard discharger is stopped at elapse of the predetermined period or upon decreasing temporarily increased turbidity of the water to be treated and filtered water having been filtrated by the is poured into the ballast tank.

PREFERRED MODE FOR CARRYING OUT THE INVENTION

A ballast water treatment device according to each of the embodiments of the present invention will now be described in detail with reference to the drawings.

Figure 1:
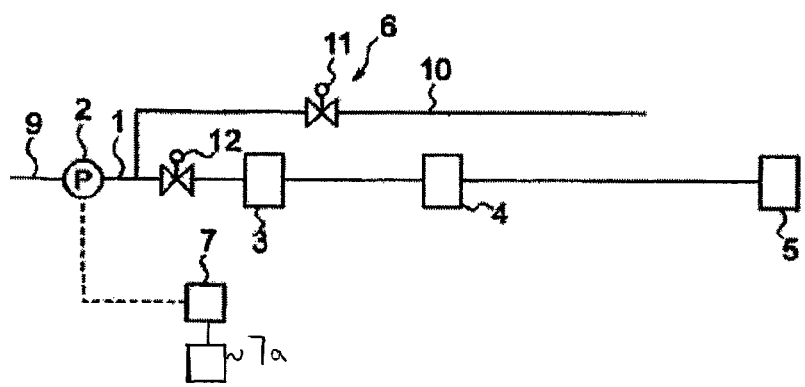
FIG. 1 is a schematic configuration diagram of a ballast water treatment device according to a first exemplary embodiment of the present invention.

A ballast water treatment device according to a first exemplary embodiment of the present invention is initially described with reference to the schematic configuration diagram in FIG. 1.

The ballast water treatment device according to the present exemplary embodiment includes, on a ballast water treatment line 1, a pump 2 for drawing and pressure feeding treatment target water, a filter 3, an ultraviolet reactor 4 for irradiating the drawn treatment target water with ultraviolet, a ballast tank 5 for storing treated water having been treated with ultraviolet, an outboard discharger 6, and a controller 7 having a control function of not passing treatment target water drawn for a predetermined period from the start of drawing treatment target water through the filter 3 and the ultraviolet reactor 4 but discharging outboard by the outboard discharger 6, stopping discharging outboard by the outboard discharger 6 at elapse of the predetermined period, and pouring into the ballast tank 5 treated water having been filtrated by the filter 3 and having been treated with ultraviolet by the ultraviolet reactor 4.

The controller 7 according to the present exemplary embodiment includes a timer 7a that checks a period elapsed from the start of drawing treatment target water.

The predetermined period from the start of drawing treatment target water is set as a period required for temporary increased turbidity because of rise of mud or sand due to drawing at the bottom of the sea (alternatively a lake, a river, or the like) around a drawing port called a sea chest (not shown) to decrease to turbidity at around a level before the start of drawing.

More specifically, the upstream ballast water treatment line 1 is provided with the pump 2, the filter 3, and the ultraviolet reactor 4 in the listed order from the upstream end. The pump 2 at the upstream end of the ballast water treatment line 1 is connected to a treatment target water drawing line 9 in the present exemplary embodiment. The ballast water treatment line 1 is connected, at an upstream portion of the filter 3, with an outboard discharge line 10 that bypasses the filter 3 and the ultraviolet reactor 4 and is used for discharging outboard drawn treatment target water. The outboard discharge line 10 is provided with an outboard discharge valve 11 serving as the outboard discharger 6. The ballast water treatment line 1 is provided with a treated water valve 12 that is located between the filter 3 and the outboard discharge line 10 connected to the upstream portion of the filter 3.

The controller 7 controls to open or close the outboard discharge valve 11 serving as the outboard discharger 6 and the treated water valve 12.

The ballast water treatment device thus configured according to the present exemplary embodiment treats treatment target water in the following manner.

Initially, the treated water valve 12 is closed, the outboard discharge valve 11 is opened, and the pump 2 is started. When the pump 2 is started, treatment target water flows to the outboard discharge line 10 and is discharged outboard by the outboard discharger 6 without passing though the filter 3 and the ultraviolet reactor 4.

When treatment target water starts being drawn, the timer provided to the controller 7 starts counting. When the timer checks elapse of the predetermined period from the start of drawing treatment target water, the treated water valve 12 is opened and the outboard discharge valve 11 is closed to stop discharging outboard treatment target water. Treatment target water passes through the filter 3 and the ultraviolet reactor 4. The filter 3 catches large organisms and the like which are hard to be killed through the ultraviolet treatment by the ultraviolet reactor 4. Microbes and the like in the treatment target water are subsequently killed through the ultraviolet treatment by the ultraviolet reactor 4. Treated water obtained by killing microbes and the like therein is then fed into the ballast tank 5 as ballast water. Discharging outboard treatment target water can be stopped when the timer checks elapse of the predetermined period from the start of drawing treatment target water, or at elapse of a predetermined period.

Figure 2:
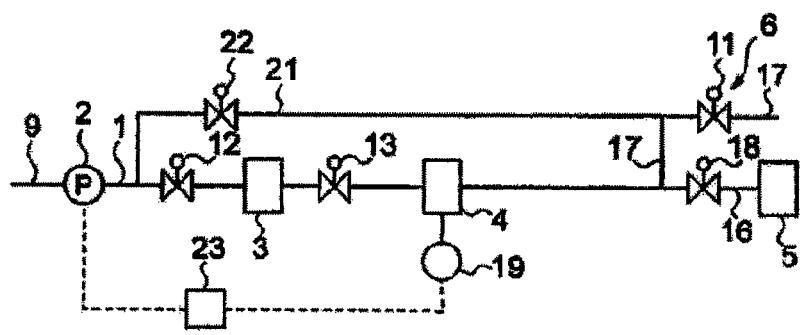
FIG. 2 is a schematic configuration diagram of a ballast water treatment device according to a second or third exemplary embodiment of the present invention.

A ballast water treatment device according to a second exemplary embodiment of the present invention is described next with reference to the schematic configuration diagram in FIG. 2.

Configurations in the ballast water treatment device according to the present exemplary embodiment identical with those in the first exemplary embodiment are denoted by the identical reference signs. The description same as that in the first exemplary embodiment is not provided repeatedly in the present exemplary embodiment where appropriate.

Similarly to the first exemplary embodiment, the ballast water treatment device according to the present exemplary embodiment includes, on the ballast water treatment line 1, the pump 2 for drawing and pressure feeding treatment target water, the filter 3, the ultraviolet reactor 4 for irradiating the drawn treatment target water with ultraviolet, and the ballast tank 5 for storing treated water having been treated with ultraviolet.

The ballast water treatment line 1 according to the present exemplary embodiment is divided, at a downstream portion of the ultraviolet reactor 4, into a ballast water pouring line 16 and an outboard discharge line 17. The ballast water pouring line 16 is provided with a ballast water pouring valve 18, and the outboard discharge line 17 is provided with the outboard discharge valve 11 serving as the outboard discharger 6.

The ballast water treatment line 1 is provided with a bypass line 21 that has a first end connected to an upstream portion of the filter 3 and a second end bypassing the filter and the ultraviolet reactor 4 and connected to the outboard discharge line 17. The bypass line 21 is provided with a bypass valve 22.

The ballast water treatment line 1 is also provided with the treated water valve 12 and a filter exit valve 13. The treated water valve 12 is located between the filter 3 and the first end of the bypass line 21 connected to the upstream portion of the filter 3. The filter exit valve 13 is located between the filter 3 and the ultraviolet reactor 4.

The ultraviolet reactor 4 is provided therein with an ultraviolet irradiation sensor 19 for detecting ultraviolet illuminance of an ultraviolet lamp (not shown).

The ballast water treatment device according to the present exemplary embodiment further includes a controller 23 having a control function of controlling to open or close the outboard discharge valve 11 serving as the outboard discharger 6, the treated water valve 12, the filter exit valve 13, the ballast water pouring valve 18, and the bypass valve 22, as well as a control function of flowing treatment target water along the bypass line 21 for a predetermined period from the start of drawing treatment target water to discharge outboard by the outboard discharger 6 without passing through the filter 3 and the ultraviolet reactor 4, closing the bypass line 21 at elapse of the predetermined period to pass treatment target water through the filter 3 and the ultraviolet reactor 4 and start treating with ultraviolet treatment target water passing through the ultraviolet reactor 4 and regulating the ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The predetermined period from the start of drawing treatment target water is set similarly to that of the first exemplary embodiment, and the controller 23 includes a timer (not shown) that checks a period elapsed from the start of drawing treatment target water. The predetermined illuminance of the ultraviolet lamp is set to a level of an irradiation amount sufficient for killing microbes and the like in treatment target water.

The controller 23 according to the present exemplary embodiment can optionally have a delay control function of not stopping discharging outboard by the outboard discharger 6 immediately after the ultraviolet illuminance detected by the ultraviolet irradiation sensor 19 reaches the predetermined level, but continuing discharging outboard treatment target water and stopping discharging outboard at a time point delayed by a predetermined period from a time point when the ultraviolet illuminance reaches the predetermined level to pour treated water having been treated with ultraviolet into the ballast tank 5.

A delayed period by the predetermined period from the time point when the ultraviolet illuminance reaches the predetermined level is set when the ultraviolet illuminance reaches the predetermined level, as a period until treatment target water located downstream of the ultraviolet reactor 4 and treated by insufficiently killing microbes is discharged outboard.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 23 starts counting. When the timer checks elapse of the predetermined period from the start of drawing treatment target water, the bypass valve 22 is closed and the treated water valve 12 and the filter exit valve 13 are then opened to continue discharging outboard treatment target water. While treatment target water is continuously discharged outboard, treatment target water is caused to pass through the filter 3 and the ultraviolet reactor 4 so that treatment target water passing through the ultraviolet reactor 4 starts being treated with ultraviolet, the ultraviolet illuminance is regulated, the outboard discharge valve 11 is closed to stop discharging outboard when the ultraviolet illuminance detected by the ultraviolet irradiation sensor 19 reaches the predetermined level, and the ballast water pouring valve 18 is opened.

In this manner, the filter 3 catches large organisms and the like which are hard to be killed through the ultraviolet treatment by the ultraviolet reactor 4. Microbes and the like in the treatment target water are subsequently killed through the ultraviolet treatment by the ultraviolet reactor 4. Treated water obtained by killing microbes and the like therein is then fed into the ballast tank 5 as ballast water.

The controller 23 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

A ballast water treatment device according to a third exemplary embodiment of the present invention is described next.

The ballast water treatment device according to the present exemplary embodiment is different from that of the second exemplary embodiment in the control function of the controller 23 and other configurations are identical therewith. Similarly to the second exemplary embodiment, the ballast water treatment device according to the present exemplary embodiment is described with reference to the schematic configuration diagram in FIG. 2.

The controller 23 in the ballast water treatment device according to the present exemplary embodiment has a control function of flowing treatment target water along the bypass line 21 for a predetermined period from the start of drawing treatment target water to discharge outboard by the outboard discharger 6 without passing through the filter 3 and the ultraviolet reactor 4, passing treatment target water through the filter 3 and the ultraviolet reactor 4 at elapse of the predetermined period and then closing the bypass line 21 to start treating with ultraviolet treatment target water passing through the ultraviolet reactor 4 and regulating ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 23 starts counting. When the timer checks elapse of the predetermined period from the start of drawing treatment target water, the treated water valve 12 and the filter exit valve 13 are opened to continue discharging outboard treatment target water. While treatment target water is continuously discharged outboard, treatment target water is caused to pass through the filter 3 and the ultraviolet reactor 4, the bypass valve 22 is then closed so that treatment target water passing through the ultraviolet reactor 4 starts being treated with ultraviolet and the ultraviolet illuminance is regulated, the outboard discharge valve 11 is closed to stop discharging outboard when the ultraviolet illuminance detected by the ultraviolet irradiation sensor 19 reaches the predetermined level, and the ballast water pouring valve 18 is opened.

In this manner, similarly to the second exemplary embodiment, the filter 3 catches large organisms and the like which are hard to be killed through the ultraviolet treatment by the ultraviolet reactor 4. Microbes and the like in the treatment target water are subsequently killed through the ultraviolet treatment by the ultraviolet reactor 4. Treated water obtained by killing microbes and the like therein is then fed into the ballast tank 5 as ballast water.

Similarly to the second exemplary embodiment, the controller 23 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

Figure 3:
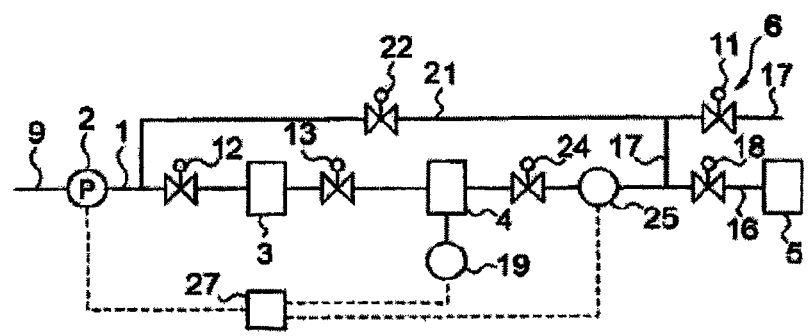
FIG. 3 is a schematic configuration diagram of a ballast water treatment device according to a fourth or fifth exemplary embodiment of the present invention.

A ballast water treatment device according to a fourth exemplary embodiment of the present invention is described next with reference to the schematic configuration diagram in FIG. 3.

Configurations in the ballast water treatment device according to the present exemplary embodiment identical with those in the second exemplary embodiment are denoted by the identical reference signs. The description same as that in the first and second exemplary embodiments is not provided repeatedly in the present exemplary embodiment where appropriate.

Similarly to the second exemplary embodiment, the ballast water treatment device according to the present exemplary embodiment includes, on the ballast water treatment line 1, the pump 2 for drawing and pressure feeding treatment target water, the filter 3, the ultraviolet reactor 4 for irradiating the drawn treatment target water with ultraviolet, and the ballast tank 5 for storing treated water having been treated with ultraviolet.

The ballast water treatment line 1 according to the present exemplary embodiment is divided, at a downstream portion of the ultraviolet reactor 4, into ballast water pouring line 16 and an outboard discharge line 17. The ballast water pouring line 16 is provided with a ballast water pouring valve 18, and the outboard discharge line 17 is provided with the outboard discharge valve 11 serving as the outboard discharger 6.

The ballast water treatment line 1 is provided with a bypass line 21 that has a first end connected to an upstream portion of the filter 3 and a second end bypassing the filter 3 and the ultraviolet reactor 4 and connected to the outboard discharge line 17. The bypass line 21 is provided with a bypass valve 22.

The ballast water treatment line 1 is also provided with the treated water valve 12 and a filter exit valve 13. The treated water valve 12 is located between the filter 3 and the first end of the bypass line 21 connected to the upstream portion of the filter 3. The filter exit valve 13 is located between the filter 3 and the ultraviolet reactor 4.

The ultraviolet reactor 4 is provided therein with the ultraviolet irradiation sensor 19 for detecting illuminance of an ultraviolet lamp (not shown).

The ballast water treatment line 1 is provided, at a downstream portion of the ultraviolet reactor 4, with a flow regulating value 24 for regulating a flow rate of treatment target water and a flowmeter 25 for detecting the flow rate.

The ballast water treatment device according to the present exemplary embodiment further includes a controller 27 having a control function of controlling to open or close the outboard discharge valve 11 serving as the outboard discharger 6, the treated water valve 12, the filter exit valve 13, the ballast water pouring valve 18, and the bypass valve 22, as well as a control function of flowing treatment target water along the bypass line 21 for a predetermined period from the start of drawing treatment target water to discharge outboard by the outboard discharger 6 without passing through the filter 3 and the ultraviolet reactor 4, closing the bypass line 21 at elapse of the predetermined period to pass treatment target water through the filter 3 and the ultraviolet reactor 4, starting treating with ultraviolet treatment target water passing through the ultraviolet reactor 4 when a flow rate detected by the flowmeter 25 reaches a predetermined level and regulating the ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The predetermined period from the start of drawing treatment target water is set similarly to that of the first exemplary embodiment, and the controller 27 includes a timer (not shown) that checks a period elapsed from the start of drawing treatment target water. The predetermined illuminance of the ultraviolet lamp is set to a level similar to that of the second exemplary embodiment.

The predetermined flow rate of treatment target water is set such that microbes and the like in the treatment target water can be killed by ultraviolet irradiation according to the correlation between the ultraviolet illuminance to treatment target water and a period of ultraviolet irradiation.

The controller 27 according to the present exemplary embodiment can optionally have the delay control function similarly to the second exemplary embodiment.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 27 starts counting. When the timer checks elapse of the predetermined period from the start of drawing treatment target water, the bypass valve 22 is closed and the treated water valve 12 and the filter exit valve 13 are then opened to continue discharging outboard treatment target water. While treatment target water is continuously discharged outboard, treatment target water is caused to pass through the filter 3 and the ultraviolet reactor 4. The flow rate of treatment target water flowing along the ballast water treatment line 1 is regulated by the flow regulating value 24 while the flow rate is detected by the flowmeter 25. When the flowmeter 25 detects that the flow rate reaches the predetermined level, the ultraviolet lamp in the ultraviolet reactor 4 is lit and the ultraviolet illuminance is regulated. The outboard discharge valve 11 is closed to stop discharging outboard when the ultraviolet illuminance detected by the ultraviolet irradiation sensor 19 reaches the predetermined level, and the ballast water pouring valve 18 is opened.

In this manner, the filter 3 catches large organisms and the like which are hard to be killed through the ultraviolet treatment by the ultraviolet reactor 4. The subsequent ultraviolet treatment by the ultraviolet reactor 4 enables irradiation of treatment target water with a predetermined amount of ultraviolet to kill microbes and the like in the treatment target water. Treated water obtained by killing microbes and the like therein is then fed into the ballast tank 5 as ballast water.

The ballast water treatment device according to the present exemplary embodiment further includes the flowmeter 25 that is located downstream of the ultraviolet reactor 4 and detects a flow rate. Treatment target water passing through the ultraviolet reactor 4 starts being treated with ultraviolet when the flow rate detected by the flowmeter 25 reaches the predetermined level. The ultraviolet treatment can be performed more effectively and efficiently, and treated water poured into the ballast tank 5 can be treated by more reliably killing microbes therein.

The controller 27 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

A ballast water treatment device according to a fifth exemplary embodiment of the present invention is described next.

The ballast water treatment device according to the present exemplary embodiment is different from that of the fourth exemplary embodiment in the control function of the controller 27 and other configurations are identical therewith. Similarly to the fourth exemplary embodiment, the ballast water treatment device according to the present exemplary embodiment is described with reference to the schematic configuration diagram in FIG. 3.

The controller 27 in the ballast water treatment device according to the present exemplary embodiment has a control function of flowing treatment target water along the bypass line 21 for a predetermined period from the start of drawing treatment target water to discharge outboard by the outboard discharger 6 without passing through the filter 3 and the ultraviolet reactor 4, passing treatment target water through the filter 3 and the ultraviolet reactor 4 at elapse of the predetermined period and then closing the bypass line 21, starting treating with ultraviolet treatment target water passing through the ultraviolet reactor 4 when a flow rate detected by the flowmeter 25 reaches a predetermined level and regulating ultraviolet illuminance, and stopping discharging outboard by the outboard discharger 6 when the ultraviolet illuminance detected by the ultraviolet irradiation sensor 19 reaches a predetermined level to pour treated water having been treated with ultraviolet into the ballast tank 5.

The ballast water treatment device thus configured according to the present exemplary embodiment treats treatment target water in the following manner.

Initially, the treated water valve 12, filter exit valve 13, and the ballast water pouring valve 18 are closed, the bypass valve 22 and the outboard discharge valve 11 are opened, and the pump 2 is started. When the pump 2 is started, treatment target water flows to the bypass line 21 and the outboard discharge line 17 and is discharged outboard by the outboard discharger 6 without passing though the filter 3 and the ultraviolet reactor 4.

When treatment target water starts being drawn, the timer provided to the controller 27 starts counting. When the timer checks elapse of the predetermined period from the start of drawing treatment target water, the treated water valve 12 and the filter exit valve 13 are opened to continue discharging outboard treatment target water. While treatment target water is continuously discharged outboard, treatment target water is caused to pass through the filter 3 and the ultraviolet reactor 4. The bypass valve 22 is then closed, and the flow rate of treatment target water flowing along the ballast water treatment line 1 is regulated by the flow regulating value 24 while the flow rate is detected by the flowmeter 25. When the flowmeter 25 detects that the flow rate reaches the predetermined level, the ultraviolet lamp in the ultraviolet reactor 4 is lit and the ultraviolet illuminance is regulated to reach the predetermined level. The outboard discharge valve 11 is closed to stop discharging outboard when the ultraviolet illuminance detected by the ultraviolet irradiation sensor 19 reaches the predetermined level, and the ballast water pouring valve 18 is opened.

In this manner, similarly to the fourth exemplary embodiment, the filter 3 catches large organisms and the like which are hard to be killed through the ultraviolet treatment by the ultraviolet reactor 4. The subsequent ultraviolet treatment by the ultraviolet reactor 4 enables irradiation of treatment target water with a predetermined amount of ultraviolet to kill microbes and the like in the treatment target water. Treated water obtained by killing microbes and the like therein is then fed into the ballast tank 5 as ballast water.

The ballast water treatment device according to the present exemplary embodiment further includes the flowmeter 25 that is located downstream of the ultraviolet reactor 4 and detects a flow rate. Treatment target water passing through the ultraviolet reactor 4 starts being treated with ultraviolet when the flow rate detected by the flowmeter 25 reaches the predetermined level. The ultraviolet treatment can be performed more effectively and efficiently, and treated water poured into the ballast tank 5 can be treated by more reliably killing microbes therein.

The controller 27 having the delay control function does not stop discharging outboard by the outboard discharger 6 immediately after the ultraviolet illuminance detected by the ultraviolet irradiation sensor 19 reaches the predetermined level, but continues discharging outboard treatment target water and stops discharging outboard at the time point delayed by the predetermined period from the time point when the ultraviolet illuminance reaches the predetermined level to pour treated water having been treated with ultraviolet into the ballast tank 5.

The present invention can be embodied in other various forms without departing from the spirit or the leading features thereof. The above embodiments or examples are thus merely illustration on any points and should not be interpreted limitedly. The scope of the present invention is recited by the claims and is never restricted by the description. Any modification or alteration belonging to the equivalent range of the claims is made within the scope of the present invention.

EXPLANATION OF REFERENCE NUMERALS

1 Ballast water treatment line
2 Pump

3 Filter
4 Ultraviolet reactor
5 Ballast tank
6 Outboard discharger
7, 23, 27 Controller
10, 17 Outboard discharge line
19 Ultraviolet irradiation sensor
21 Bypass line
25 Flowmeter

The invention claimed is:

1. A ballast water treatment device configured to provide treated water to a vessel, the vessel including a pump for pumping and pressure feeding water to be treated, an outboard discharger configured to discharge the water to be treated through an outboard discharge line, a ballast tank, a ballast water pouring line, a ballast water pouring valve, a bypass line, the ballast water treatment device comprising:
  a ballast water treatment line;
  a filter, disposed in the ballast water treatment line, for filtrating the water to be treated which is pumped;
  a controller comprising a timer configured to check a time period elapsed from a start of pumping the water to be treated;
  a treated water valve connected to the ballast water treatment line;
  a bypass valve connected to the bypass line; and
  wherein the bypass line is configured to bypass the filter,
  wherein the ballast water treatment line is configured to be connected to the pump, the filter, and the outboard discharger;
  wherein the controller controls the treated water valve to close and the bypass valve to open such that:
    the bypass valve allows the water to be treated to bypass the filter to cause the water to be treated to pass through the bypass line for a predetermined time period from the start of pumping the water to be treated; and
    the outboard discharger discharges outboard the water to be treated which has been pumped through the outboard discharge line which is connected to a downstream side of the ballast water treatment line, for the predetermined time period; and
  wherein the controller controls the treated water valve to open and the bypass valve to close such that the outboard discharger stops discharging the water to be treated outboard after the timer indicates elapse of the predetermined time period, and the ballast water pouring valve pours water having been filtrated by the filter through the ballast water pouring line into the ballast tank.

2. The ballast water treatment device according to claim 1 further comprising:
  an ultraviolet reactor,
  wherein the controller controls the ultraviolet reactor to irradiate the water which is filtrated by the filter with ultraviolet rays.

3. A ballast water treatment device configured to provide treated water to a vessel, the vessel including a pump for pumping and pressure feeding water to be treated, an outboard discharger configured to discharge the water to be treated, a ballast tank, a ballast water pouring unit, a bypass line, the ballast water treatment device comprising:
  a ballast water treatment line;
  a filter for filtrating the water to be treated which is pumped;
  a controller;
  an ultraviolet irradiation sensor for detecting ultraviolet illuminance in the ultraviolet reactor;
  a filter exit unit disposed at the ballast water treatment line between the filter and the ultraviolet reactor;
  a bypass valve disposed at the bypass line; and
  an ultraviolet reactor,
  wherein the ballast water treatment line is configured to be connected to the pump, the filter, and the outboard discharger,
  wherein the controller controls:
    the outboard discharger to discharge outboard the water to be treated which has been pumped, for a predetermined time period from a start of pumping the water to be treated;
    the outboard discharger to stop discharging outboard after elapse of the predetermined time period, and to pour water having been filtrated by the filter to pour into the ballast tank;
    the ultraviolet reactor to irradiate the water which is filtrated by the filter with ultraviolet rays;
    the bypass valve to allow the water to be treated to bypass the filter and ultraviolet reactor to cause the water to be treated to pass through the bypass line for the predetermined time period,
    the bypass valve to close the bypass line after elapse of the predetermined time period;
    the ballast water pouring unit which is connected to the ballast water treatment line between the ultraviolet reactor and the ballast tank and the filter exit unit to pass the water to be treated through the filter and the ultraviolet reactor subsequent to closing of the bypass line;
    the ultraviolet reactor to start treating the filtrated water passing through the ultraviolet reactor and to regulate ultraviolet illuminance;
    to stop the outboard discharger from discharging treated water having passed the ultraviolet reactor outboard when the ultraviolet illuminance detected by the ultraviolet irradiation sensor subsequently reaches a predetermined level; and
    the ballast water pouring unit to pour the treated water into the ballast tank.

4. The ballast water treatment device according to claim 3, further comprising:
  a flowmeter located downstream of the ultraviolet reactor, for detecting a flow rate;
  wherein the controller controls the ballast water pouring unit and the filter exit unit to start treating the filtrated water passing through the ultraviolet reactor with ultraviolet rays when the flow rate detected by the flowmeter reaches a predetermined level.

* * * * *